US008582001B2

(12) United States Patent
Tzur et al.

(10) Patent No.: US 8,582,001 B2
(45) Date of Patent: Nov. 12, 2013

(54) EXPOSURE CONTROL FOR HIGH DYNAMIC RANGE IMAGE CAPTURE

(75) Inventors: Meir Tzur, Haifa (IL); Victor Pinto, Zichron-Yaakov (IL)

(73) Assignee: CSR Technology Inc., Sunnyvale, CA (US)

(*) Notice: Subject to any disclaimer, the term of this patent is extended or adjusted under 35 U.S.C. 154(b) by 156 days.

(21) Appl. No.: 12/756,035

(22) Filed: Apr. 7, 2010

(65) Prior Publication Data

US 2010/0259636 A1 Oct. 14, 2010

Related U.S. Application Data

(60) Provisional application No. 61/167,600, filed on Apr. 8, 2009.

(51) Int. Cl.
*H04N 5/235* (2006.01)
*G03B 7/00* (2006.01)

(52) U.S. Cl.
USPC ........................................ 348/229.1; 348/362

(58) Field of Classification Search
USPC .................... 348/222.1, 229.1, 230.1, 362
See application file for complete search history.

(56) References Cited

U.S. PATENT DOCUMENTS

| 5,194,960 A * | 3/1993 | Ota ................................. 348/362 |
| 5,801,773 A | 9/1998 | Ikeda |
| 5,828,793 A | 10/1998 | Mann |
| 6,177,958 B1 * | 1/2001 | Anderson ....................... 348/362 |
| 6,204,881 B1 | 3/2001 | Ikeda et al. |
| 6,720,993 B1 | 4/2004 | Hwang et al. |
| 7,317,844 B1 | 1/2008 | Horne |
| 7,403,707 B2 | 7/2008 | Raskar et al. |
| 7,948,538 B2 * | 5/2011 | Asoma ............................ 348/297 |
| 8,106,967 B2 | 1/2012 | Tsuchiya |
| 8,228,392 B2 | 7/2012 | Siddiqui et al. |
| 2003/0117412 A1 | 6/2003 | Brooksby et al. |
| 2004/0095472 A1 * | 5/2004 | Yoshida et al. ........... 348/208.12 |
| 2005/0013501 A1 | 1/2005 | Kang et al. |
| 2005/0030315 A1 | 2/2005 | Cohen et al. |
| 2006/0133688 A1 | 6/2006 | Kang et al. |

(Continued)

FOREIGN PATENT DOCUMENTS

WO    2010/123923 A1    10/2010

OTHER PUBLICATIONS

International Search Report and Written Opinion, dated Jul. 2, 2010, PCT/US2010/030301.

(Continued)

*Primary Examiner* — Daniel M Pasiewicz
(74) *Attorney, Agent, or Firm* — Frommer Lawrence & Haug LLP; John W. Branch

(57) ABSTRACT

A device and methods are provided for producing a high dynamic range (HDR) image of a scene are disclosed and claimed. In one embodiment, method includes setting an exposure period of an image sensor of the digital camera and capturing image data based on the exposure period. The method may further include checking the image data to determine whether the number of saturated pixels exceeds a saturation threshold and checking the image data to determine whether the number of cutoff pixels exceeds a cutoff threshold. The method may further include generating a high dynamic range image based on image data captured by the digital camera, wherein the high dynamic range image is generated based on a minimum number of images to capture a full dynamic range of the scene.

25 Claims, 4 Drawing Sheets

(56) References Cited

U.S. PATENT DOCUMENTS

| | | | |
|---|---|---|---|
| 2007/0242900 | A1 | 10/2007 | Chen et al. |
| 2008/0043114 | A1 | 2/2008 | Sung et al. |
| 2008/0094486 | A1 | 4/2008 | Fuh et al. |
| 2008/0284872 | A1* | 11/2008 | Asoma ................ 348/229.1 |
| 2009/0046947 | A1 | 2/2009 | Kobayashi |
| 2009/0060315 | A1 | 3/2009 | Harris et al. |
| 2010/0157078 | A1 | 6/2010 | Atanassov et al. |
| 2010/0232726 | A1 | 9/2010 | Liu |
| 2010/0271512 | A1 | 10/2010 | Garten |
| 2011/0211732 | A1 | 9/2011 | Rapaport |
| 2011/0254976 | A1 | 10/2011 | Garten |
| 2012/0218442 | A1 | 8/2012 | Jandhyala et al. |
| 2012/0288217 | A1 | 11/2012 | Zhai et al. |
| 2012/0293685 | A1 | 11/2012 | Garten |

OTHER PUBLICATIONS

Official Communication for U.S. Appl. No. 12/763,693 mailed Mar. 29, 2012.
International Search Report and Written Opinion for International Application No. PCT/US2010/031780 dated Jun. 11, 2010.
Reinhard, E. et al., "High Dynamic Range Imaging Acquisition, Display, and Image-Based Lighting," The Morgan Kaufmann Series in Computer Graphics and Geometric Modeling, 2005, Chapter 4, pp. 115-165.
Kang, S. B. et al., "High Dynamic Range Video," Interactive Visual Media Group, Microsoft Research, Jul. 2003, pp. 1-7.
"Enfuse—PanoTools.org Wiki," last modified Jan. 30, 2010, pp. 1-8 http://wiki.panotools.org/Enfuse.
Sunday, D., "Bounding Containers for Polygons, Polyhedra, and Point Sets (2D & 3D)," Algorithm 8, Jun. 28, 2011, 12 pages http://softsurfer.com/Archive/algorithm_0107_algorithm_0107.html.
Gallo, O. et al., "Artifact-free High Dynamic Range Imaging," 2009 IEEE International Conference on Computational Photography (ICCP 2009), IEEE, US, Apr. 16, 2009, 7 pages, XP002612399.
Grosch, T. et al., "Fast and Robust High Dynamic Range Image Generation with Camera and Object Movement," Vision, Modeling and Visualization 2006, Aachen, Germany, IOS Press Nov. 22, 2006.
Li et al., "Movement Detection for the Synthesis of High Dynamic Range Images," Proceedings of the 2010 IEEE 17th International Conference on Image Processing, Sep. 26-29, 2010, Hong Kong, pp. 3133-3136.
Search Report issued by the United Kingdom Intellectual Property Office on Aug. 16, 2012 in related UK Patent Application No. GB 12068334.
Search Report in GB Patent Application No. 1206833.4 dated Dec. 18, 2012.
Extended Search Report issued by the European Patent Office for EP Application No. 12164871.1 dated Sep. 17, 2012.
Official Communication for U.S. Appl. No. 13/090,985 mailed Sep. 11, 2012.
Official Communication for U.S. Appl. No. 13/090,985 mailed Jan. 3, 2013.
Official Communication for U.S. Appl. No. 13/091,068 mailed Jan. 3, 2013.
Official Communication for U.S. Appl. No. 13/091,068 mailed Mar. 12, 2013.
Official Communication for U.S. Appl. No. 13/090,985 mailed Mar. 29, 2013.
Official Communication for U.S. Appl. No. 13/091,068 mailed Jun. 24, 2013.
Mertens, T. et al., "Exposure Fusion," 15th Pacific Conference on Computer Graphics and Applications, Oct. 29, 2007-Nov. 2, 2007, pp. 382-390.
Rövid, A. et al., "Gradient Based Synthesized Multiple Exposure Time HDR Image," Instrumentation and Measurement Technology Conference Proceedings, 2007, IMTC 2007, May 1-3, 2007, pp. 1-6.
Official Communication for U.S. Appl. No. 13/569,118 mailed Aug. 30, 2013.

* cited by examiner

EXPOSURE CONTROL FOR HIGH DYNAMIC RANGE IMAGE CAPTURE

CROSS-REFERENCE TO RELATED APPLICATION

This application claims the benefit of U.S. Provisional Application No. 61/167,600, filed Apr. 8, 2009.

FIELD OF THE INVENTION

The present invention relates in general to high dynamic range (HDR) digital imaging and in particular to determining and setting exposure parameters for detection of image data by an imaging device, such as a digital camera, to produce a high dynamic range (HDR) image of a scene.

BACKGROUND

Dynamic range is the ratio between the largest and smallest possible signals a sensor can generate. As used herein, the term "dynamic range" refers to the dynamic range of a digital imaging device, such as a digital camera.

The dynamic range of a digital camera can be defined as the ratio of the maximum measurable light intensity to the minimum measurable light intensity, and is usually measured in a base-2 logarithmic value, or "stop," which describes the total light range by powers of 2. For example, a contrast ratio of 1024:1 (or $2^{10}$:1) could therefore be described as having a dynamic range of 10 stops. Each unit stop, or power of an exposure step, may be described as one unit of an exposure value (e.g., 1 EV).

A drawback of typical digital cameras may be the capacity to reproduce an image scene with high dynamic illumination range, or high contrast. In many instances, the dynamic illumination range of a digital imaging device is limited by the sensor technology and/or parameter settings of the digital camera. For example, automatic settings of conventional cameras can result in images that are over or under exposed. Accordingly, attempts have been made to increase the dynamic range of imaging devices.

One conventional approach attempts to increase the dynamic range of an imaging device by capturing many images of a scene. Further, these images are usually captured with the same settings. However, with hand-held digital cameras, the number of images captured for generating a high dynamic range of a scene should be minimized in order to minimize various artifacts that can be introduced to scene data. These artifacts may result from local motion within the scene and/or global motion, such as camera shake, between the camera and the scene. Global motion may be addressed by supporting the imaging device, for example using a tripod. However, a fixed support does not address the effects of local motion. Further, this approach and other conventional approaches do not address determining exposure parameters for image capture, as conventional enhancements are typically performed during post processing.

Another conventional approach involves the use of specialized sensors to capture a single image frame with varying parameters of the sensor. The conventional methods and devices based on these sensors, however, typically result in image data with reduced resolution as detected image data is captured with a single sensor reducing the detail of captured data. These sensors may further be disadvantageous due to cost involved to provide the specialized sensors. Other conventional approaches relying on post-processing of image data similarly fail to address providing HDR image detection for users of portable imaging devices such as digital cameras.

Accordingly, there is a need in the art for high dynamic range (HDR) imaging devices which overcome one or more of the aforementioned drawbacks.

BRIEF SUMMARY OF THE INVENTION

Disclosed and claimed herein are a device and methods for producing high dynamic range (HDR) image data. In one embodiment, a method for producing high dynamic range image of a scene by a digital camera includes setting an exposure period of an image sensor of the digital camera, capturing image data, by the digital camera, based on the exposure period, checking the image data to determine whether a number of saturated pixels exceeds saturation threshold, and checking the image data to determine whether a number of cutoff pixels exceeds a cutoff threshold. The method further includes generating a high dynamic range image based on image data captured by the digital camera, wherein the high dynamic range image is generated based on a minimum number of images to capture a full dynamic range of the scene.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview and Terminology

Figure 1:
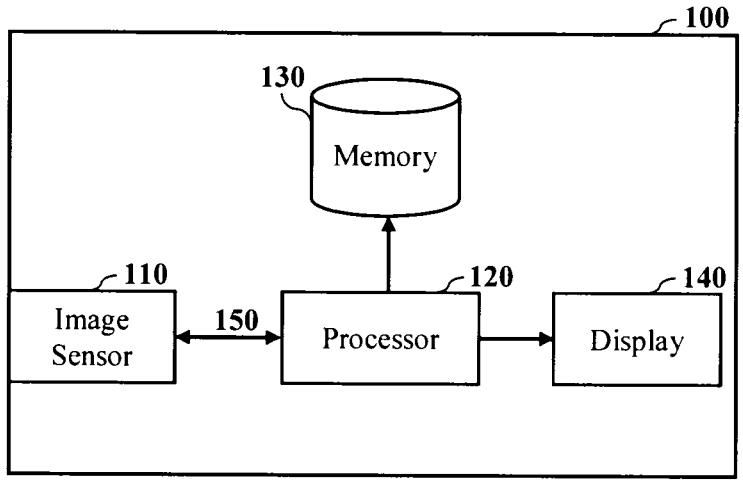
FIG. 1 depicts a simplified block diagram of an imaging device according to one embodiment of the invention.

One aspect of the present invention relates to determining exposure parameters for capturing high dynamic range (HDR) image data for a scene. In one embodiment, HDR images may be generated based on a series of captured images, wherein the series of images is associated with exposure parameters determined by the imaging device. This technique allows for a greater dynamic illumination range between the lightest and darkest areas of a scene to be captured in contrast with that of standard digital imaging techniques or photographic methods. Further, a wider dynamic illumination range is provided to allow for HDR images which more accurately represent the wide range of intensity levels found in real scenes, ranging from direct sunlight to faint starlight.

In one embodiment, exposure parameters may be automatically determined and set by an imaging device in order to capture image data to generate a high dynamic range image. For example, the exposure parameters may provide for a minimum number of images to be captured and exposure periods for each image to be captured. Based on one or more images captured by the imaging device, a high dynamic range of a scene may be produced. In one embodiment, a process for producing a high dynamic range image of it scene includes determining an illumination range for a scene based on one or more preview images captured by the imaging device. Based on the determined illumination range of the scene, the exposure parameters may be determined by the imaging device, The digital imaging device may then capture image data to generate a HDR image.

According to another embodiment, a process is provided for generating a HDR image based on a predetermined exposure setting. As will be discussed in more detail below, the process may include adjusting the exposure parameter based on one or more of a saturation threshold and cutoff threshold, wherein subsequent image data may be captured based on modified exposure parameters. According to another embodiment, the process may further include determining an illumination range to provide a predefined exposure setting. In that fashion, the number of images required to generate a HDR image of the entire dynamic illumination range of a scene may be minimized. Similarly, exposure parameters may be tailored to a scene and thus, provide dynamic illumination range calculations.

In yet another embodiment, an imaging device is provided to generate HDR images according to one or more the processes described herein. The imaging device, such as a digital camera, may be configured to generate a HDR image in real-time and/or near real-time, including determining exposure parameters. As will be described in more detail below, the device may further be configured to determine and establish exposure settings of an image sensor.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that can be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

Exemplary Embodiments

Referring now to the figures, FIG. 1 depicts a simplified block diagram of an imaging device, and more particularly a digital camera, according to one or more embodiments of the invention. Digital camera 100 includes sensor 110. Sensor 110 may relate to a combination of an optical lens and light detection circuitry (e.g., CMOS integrated circuit, etc.). Image data detected by sensor 110 may be provided to processor 120 as captured image data via path 150.

Processor 120 may be implemented using one of an integrated circuit microprocessor, microcontroller, digital signal processor and processor in general. Processor 120 may be configured to process received image data based on, for example, specific image processing algorithms stored in memory 130 in the form of processor-executable instructions. Processor 120 may further be configured to provide exposure parameters, such as exposure periods, to sensor 110 by way of path 150.

Processed image data may be stored in memory 130 and/or provided to display 140 for viewing. It should be appreciated that memory 130 may relate to any combination of different memory storage devices, such as a hard drive, random access memory (RAM), read only memory (ROM), flash memory, or any other type of volatile and/or nonvolatile memory. It should further be appreciated that memory 130 may be implemented as multiple or discrete memories for storing processed image data, as well as the processor-executable instructions for processing the captured image data. Further, memory 130 may include to removable memory, such as flash memory, for storage of image data.

Display 140 may relate to a liquid crystal display (LCD) incorporated into digital camera 100 for display of captured image data, and HDR image data. Alternatively, it should be appreciated that an external display device may be coupled to digital camera 100 for display and/or output of HDR image data. Although FIG. 1 has been described above with respect to a digital camera, it should be appreciated that the device may relate to other devices, such as imaging devices in general.

Although the imaging device of FIG. 1. has been described as a digital camera, it should also be appreciated that the device may relate to, or be included in, other devices, such as a mobile communication device and portable communication devices in general.

Figure 2:
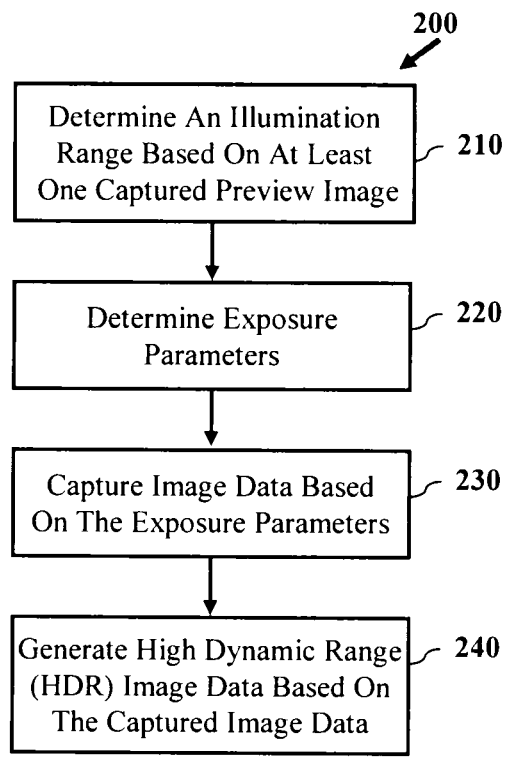
FIG. 2 depicts a process for producing a high dynamic range (HDR) image according to one embodiment of the invention.

Referring now to FIG. 2, a process is depicted for providing HDR image data of a scene according to one or more embodiments of the invention. Process 200 may be performed by one or more elements of the device of FIG. 1 (e.g., digital camera 100).

Process 200 may be initiated by determining an illumination range of a scene at block 210. According to one embodiment, the illumination range of a scene may be determined based on at least one preview image captured by the imaging device. As used herein, a "scene" may relate the area a user desires to capture with an imaging device and may include one or more objects and subjects including various levels of illumination intensity, such as light sources. As will be discussed in more detail below with respect to FIG. 3, determination of the illumination range can provide one or more exposure parameters for capturing image data. As will be discussed in more detail below, dynamic illumination range may be determined based on capturing one or more preview images.

Based on the illumination range determined at block 210, exposure parameters are determined at block 220. In one embodiment, the processor (e.g., processor 120) of the imaging device can determine the minimum number of exposures and exposure periods required for producing a HDR image of the scene. The number of exposures (N) and the corresponding exposure parameters for producing a high dynamic range image can be calculated at block 220. The number of exposures N may relate to an integer value greater than or equal to one. In certain embodiments, a smaller number of exposures N is preferred. By way of example, the number of exposures for a scene may range from 1-3 exposures. It should also be appreciated that other exposure parameters may be employed, for example, up to five exposures. According to another embodiment, if the number of exposures required is greater than one, each exposure will correspond to a different exposure period. In certain embodiments, the exposure parameters may further provide for aperture (e.g., f-number) and/or ISO settings.

In general, the maximum dynamic range $R_{max}$ (in EV units) can be determined according to the following formula:

$$R_{max} = NR_{nom} - (N-1)O_{min},$$

where
$R_{nom}$ is the dynamic range (in EV units) captured by a single exposure; and
$O_{min}$ is the minimal overlap (in EV units) between two exposures that is required by a HDR algorithm to produce an acceptable HDR image.

Accordingly, the number of exposures N may be characterized by:

$$N = \left\lceil \frac{R_{max} - O_{min}}{R_{nom} - O_{min}} \right\rceil$$

where $\lceil x \rceil$ stands for the smallest integer greater than or equal to x.

The minimum and maximum exposure periods for a scene may be characterized as $T_{min}$ and $T_{max}$, respectively. Since $\log_2(T_{max}/T_{min})$ determines the dynamic range of a given scene (in EV units), the maximum dynamic range $R_{max} \geq \log_2(T_{max}/T_{min})$. The minimum number of needed exposures N can be determined according to the above-identified relationship. For example, if the dynamic range $R_{nom}$ that can be captured by a single exposure is 8 EV, the ratio of $T_{max}/T_{min}$ is 4096 (=$2^{12}$), and assuming that the minimal overlap $O_{min}$ between two exposures to produce an acceptable HDR image is 2 EV, N can be determined by:

$$N = \left\lceil \frac{12-2}{8-2} \right\rceil = \lceil 1.66 \rceil = 2$$

According to one embodiment, the processor (e.g., processor 120) of the imaging device can calculate the number of exposures. Thus, in this example, a scene can then be captured by only two shots. Accordingly, the number of exposures required for capturing image data may be minimized by capturing only a number of images required to capture the dynamic range of the scene. Further, minimizing the number of images required for a scene may be based on the capture range of the image sensor and exposure periods for a scene. For example, the minimum number of images may be based on the illumination range of an image sensor of the digital camera, a minimum exposure period for the scene, and a maximum exposure period for the scene.

According to another embodiment, after calculating the number of required exposures N, the processor can calculate exposure periods for each exposure. The exposure periods may be determined in order to capture images, which when combined, will span the entire dynamic range and the overlaps between adjacent shots are about the same. In an exemplary embodiment, the exposure period for each shot $T_i$ may be determined by:

$$T_i = T_{min}\left(\frac{T_{max}}{T_{min}}\right)^{\frac{i}{N+1}};$$

where $1 \leq i \leq N$, and $T_{min}$ and $T_{max}$ relate to minimum and maximum exposure periods for a scene, respectively.

Accordingly, a scene requiring two exposures, $T_1 = T_{min}(2^{12})^{1/3} = 2^4 T_{min}$, and $T_2 = T_{min}(2^{12})^{2/3} = 2^8 T_{min}$.

It should further be appreciated that other formulas for determining the exposure period $T_i$ can also be used as long as the selected exposures can span the entire range of the scene and have enough overlap between each of the adjacent exposures.

Once the exposure parameters are determined in block 220, for example a number of exposures N and corresponding exposure periods, the imaging device can capture image data based on the exposure parameters for N still images at block 230. Capturing image data at block 230 may be based on a single activation of a capture button of the imaging device by a user. Further, the capture period and determination of exposure parameters may be determined in real-time, or near real-time. Process 200 may then generate a HDR image at block 240 based on the captured image data, (e.g., N images captured at block 230). In that fashion, a series of images may be captured automatically, the series of images associated with a set of exposure periods. The processor may be configured to combine the multiple images based on the optimal components of each captured image to increase the illumination range for the scene.

According to one embodiment, the processor may combine image data by normalizing image data according to the exposure period of each image, aligning the images (e.g., to compensate for movement), and then summing the image data (e.g., using a blending function based on the intensity of the image). The final result may then include tone mapping to adjust the output levels. For example, assuming two images, Im1 and Im2, where captured, wherein Im1 is captured with exposure period "exp1" and Im2 is captured with exposure period "exp2", and wherein exp2>exp1. Assuming that Im1 and Im2 are already aligned, a combined image may be described as Im(x,y)=(1-alpha(x,y))*Im1/exp1+alpha(x,y)*Im2/exp2, where alpha(x,y) gets values between 0 and 1 and is a function of Im2(x,y). For example alpha(x,y)=(255-Im2(x,y))/255, assuming Im2 is an 8 bit, gray level image. This scheme can be generalized for more than 2 images. The final image may also include a tone mapping stage.

Processes described herein for generating HDR image data and setting one or more exposure parameters may be performed in real-time, or near-real-time, in such a manner that image capture of the series of images is performed in a suitable time period for the user, for example within one to two seconds following detection of user selection of the capture button of the imaging device. It may additionally be appreciated that image capture of a series of images for producing an HDR image may be based on user selection of a mode or HDR function of the imaging device.

Figure 3:
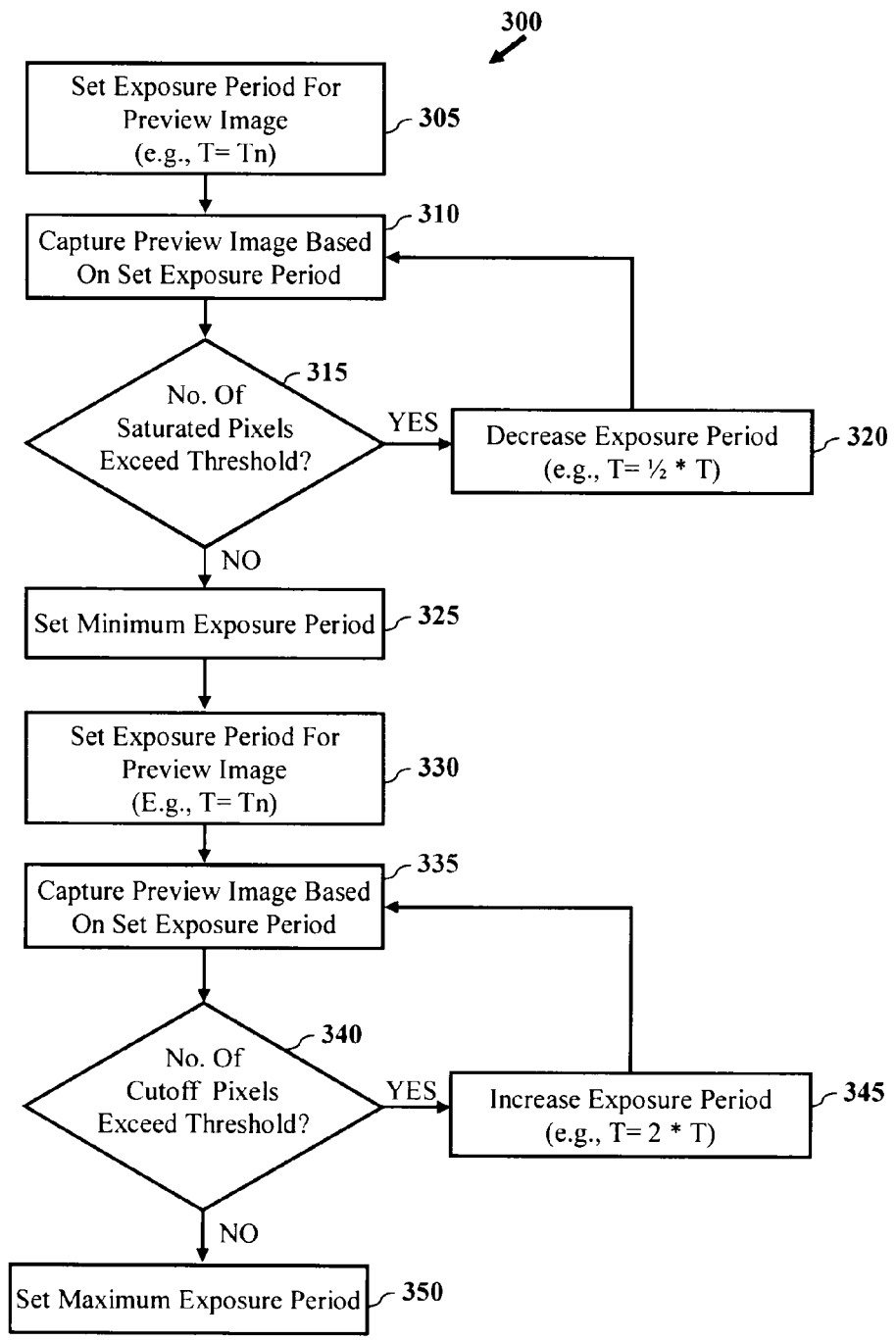
FIG. 3 depicts a process for determining an illumination range of a scene according to one or more embodiments of the invention.

Referring now to FIG. 3, a process is depicted for determining the dynamic illumination range of a scene. Process 300 may be initiated by setting an exposure period for an imaging device (e.g., digital camera 100) at block 305, For example, the exposure period T may be set to a nominal exposure period (e.g., T=T.sub.n). In a further embodiment, the nominal exposure period T.sub.n may be an initial exposure period used by the camera 100 to initiate a determination of an illumination range. in one embodiment, the nominal exposure period may be set based on an automatic exposure (AE) algorithm of the imaging device. According to another embodiment, the exposure period may be based on one or more signals detected by the imaging device (e.g., an ambient light sensor, infrared (IR) sensor, etc).

At block 310, the imaging device may capture a preview image based on a set exposure period. Preview images may be captured by the imaging device prior to detecting user selection of a capture button. For example, in one embodiment, process 300 may be initiated when power is applied to the imaging device and/or an HDR mode is selected by the user in order to determine one or more exposure periods prior to a user capturing an image. The imaging device may capture preview images at block 310 while the user is preparing to capture image data. in another embodiment, the imaging device may capture preview images automatically without user knowledge of the capture. As used herein, a "preview" image may relate to image data captured by the imaging device, wherein the image data may be employed by the imaging device to determine one or more exposure parameters. in a further embodiment, preview images may not be permanently stored by the imaging device, but stored temporarily for the detection of illumination range.

Based on one or more captured preview images, process 300 may then continue to determination block 315 to determine whether the number of saturated pixels in the preview image exceeds a threshold value, such as a saturation threshold. Saturation of the image data may be based on an exposure period that is too long. When the number of saturated pixels in the preview image exceed a predetermined value, such as a saturation threshold, ("YES" path out of decision block 315), the imaging device processor (e.g., processor 120) may decrease the exposure period of the sensor at block 320, such as output (e.g., via path 150). By way of example, the saturation threshold may be set to 1% of the image size. Further, a pixel is declared saturated if its value is above 250 in the case of an 8 bit sensor. It should be appreciated, however, that other values may be selected. For example, in the case of color images, determining the number or amount of saturation pixels at decision block 315 may be based on a luminance component. Alternatively, or in combination, the determination at decision block 315 may be base on RGB components.

At block 320, decreasing the exposure period may reduce the exposure period by halves (e.g., T=½*T). Alternatively, the exposure period may be reduced by other proportions at block 320, for example by thirds or other mathematical operations to generate the new exposure period to be used at block 310. According to another embodiment, the exposure period may be reduced in proportion to the amount of saturation (e.g., the number of saturated pixels). In such a case, the reduction-proportion becomes smaller as the amount of saturation decreases. This may decrease the time (or the number of images) required to find Tmin (or Tmax).

Based on reduced exposure period, process 300 may then capture a subsequent preview image of the scene at block 315. In that fashion, a preview image is captured with a reduced exposure period less than the nominal exposure period $T_n$ of the imaging device. The processor may then determine whether the subsequent preview image includes a number of saturated pixels above the threshold at decision block 315. Process 300 may continue to decrease the exposure period at block 320 and capture subsequent preview images at block 310 until the exposure setting results in image data are determined to be below the saturation threshold at decision block 315.

When the number of saturated pixels in a preview image does not exceed a predetermined value, such as a saturation threshold, ("NO" path out of decision block 315), the imaging device processor (e.g., processor 120) may set the minimum exposure period for the scene at block 325. The minimum exposure period $T_{min}$ may be set as the last exposure period used to capture the image of the scene. Process 300 may then determine the maximum exposure period.

Process 300 may then set an exposure period for the imaging device (e.g., digital camera 100) at block 330 to determine the maximum exposure period. For example, the exposure period may be reset at block 330 to the nominal exposure period $T_n$. Once the exposure period is set, a preview image of the scene may be captured by the imaging device according to a set exposure period at block 335, in particular the exposure period set at block 330.

Process 300 may then continue to decision block 340 to determine if the number of cutoff pixels in the captured preview image exceeds a cutoff threshold. In one embodiment, the number of cutoff pixels may be measured by the processor counting the number of pixels in the image that are below a predetermined value.

If the number of cutoff pixels exceeds the cutoff threshold ("YES" path out of decision block 340), the exposure period may be increased at block 345. For example, the exposure period may be doubled (e.g., T=2*T). It should be additionally appreciated that other variations may be employed to increase the exposure period.

Once the new exposure period is generated, process 300 may then capture a subsequent preview image of the scene at block 335. In that fashion, a preview image is captured with an increased exposure period greater than the nominal exposure period $T_n$ of the imaging device. Process 300 may then determine whether the subsequent preview image includes a number of cutoff pixels above the threshold at decision block 340. Process 300 may continue to increase the exposure period at block 335 and capture subsequent preview images at block 340 until the exposure setting results in image data below the threshold at decision block 340.

When the number of cutoff pixels in a preview image does not exceed a predetermined value, such as a cutoff threshold, ("NO" path out of decision block 340), the imaging device (e.g., processor 120) may set the maximum exposure period for the scene at block 350. The maximum exposure period $T_{max}$ may be set to the last exposure period used to capture an image of the scene.

Although the process 300 is initiated by the determination of the minimum exposure period $T_{min}$ followed by the determination of the maximum exposure period $T_{max}$ it should be appreciated that process 300 may determine the maximum exposure period $T_{max}$ prior to, or during, the determination of the minimum exposure period $T_{min}$. For example, determination of the image data exceeding the saturation threshold and the cutoff off threshold may be performed based on the same preview image.

Accordingly, process 300 can establish a minimum exposure period (e.g., $T_{min}$) and maximum exposure period (e.g., $T_{max}$) such that image data captured for generating a high dynamic range image may be captured with a minimum and/or or no saturated pixels and cutoff pixels. The minimum and maximum exposure periods may be employed for determine exposure periods as described above at block 220 of FIG. 2.

Figure 4:
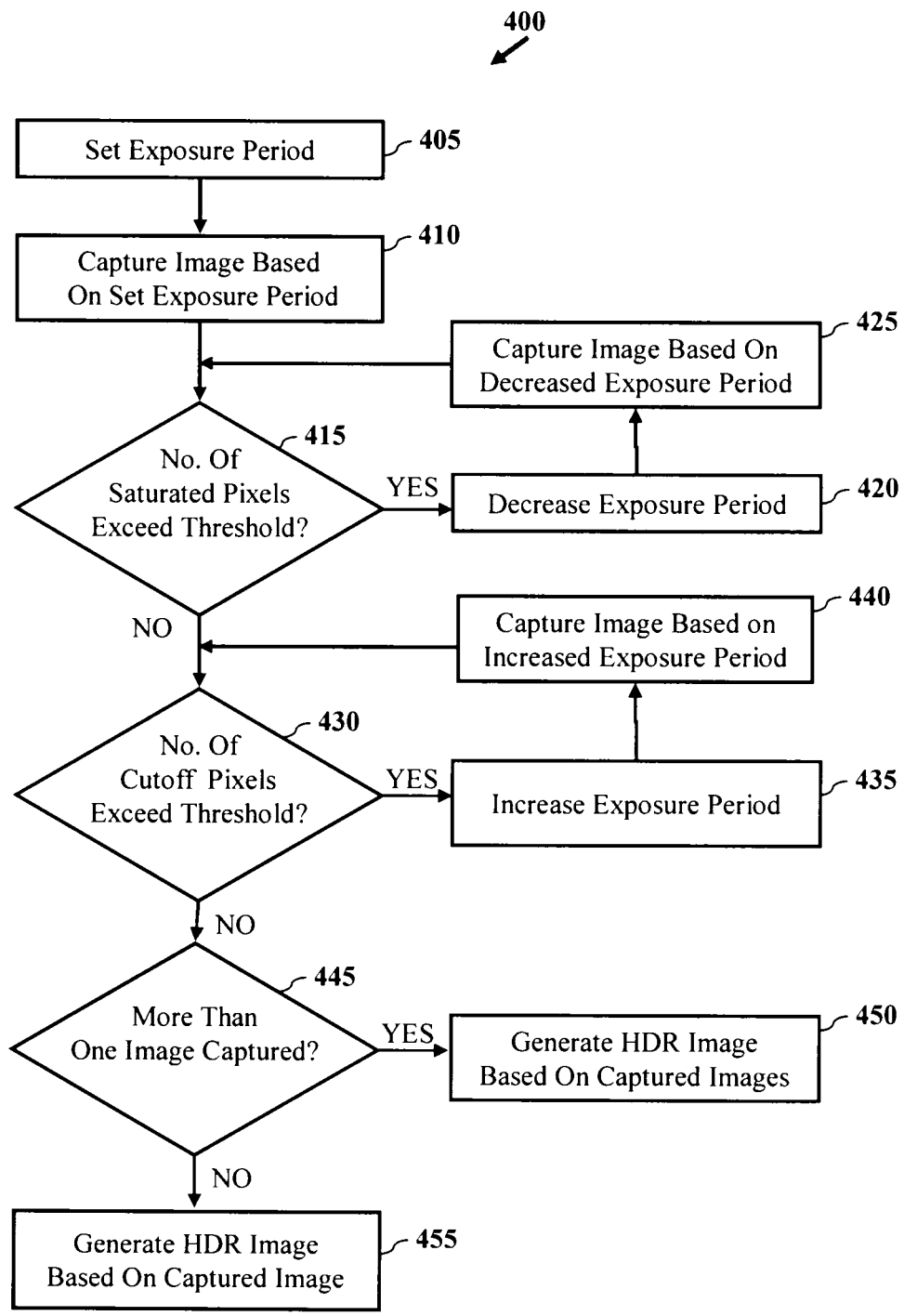
FIG. 4 depicts a process for producing a high dynamic range (HDR) image according to another embodiment of the invention.

Referring now to FIG. 4 depicts a process for producing a high dynamic range (HDR) image according to another embodiment of the invention. In contrast to the process described above with reference to FIG. 2, process 400 may not require a determination of the illumination range of the scene prior to capturing images (e.g., non-preview images) to produce a high dynamic range image.

Process 400 may be initiated by the imaging device (e.g., digital camera 100) setting an exposure period for image capture at block 405. The exposure period may be based on one or more of a nominal exposure period (e.g., $T_n$), previously calculated exposure period, sensor output of the imaging device, user setting, etc. At block 410, the imaging device may capture an image based on the set exposure period. According to another embodiment, process 400 may include a counter function to count the number of images captured (not shown in FIG. 4).

Once a first image is captured, process 400 may then determine whether the captured image includes a number of saturated pixels that exceeds a predetermined threshold value (e.g., saturation threshold) at decision block 415. When the number of saturated pixels exceeds the predetermined value ("YES" path out of decision block 415), process 400 may then decrease the exposure period at block 420 and capture image data based on the decreased exposure period at block 425. Process 400 may then check if image data captured at block 425 includes a number of saturated pixels that exceeds a predetermined threshold value (e.g., saturation threshold) at decision block 415. If the image data still exceeds the threshold, process 400 can further decrease the exposure period and capture additional image data.

When the number of saturated pixels does not exceed the predetermined value ("NO" path out of decision block 415), process 400 may then determine whether the captured image data includes a number of cutoff pixels that exceeds a predetermined threshold value (e.g., cutoff threshold) at decision block 430. In one embodiment, process 400 may check the most recent captured image. According to another embodiment, process may check the image with the largest exposure period.

When the number of cutoff pixels exceeds the predetermined value ("YES" path out of decision block 430), process 400 may then increase the exposure period at block 435 and capture image data based on the increased exposure period at block 440. Process 400 may then check if image data captured at block 440 includes a number of cutoff pixels that exceeds a predetermined threshold value (e.g., cutoff threshold) at decision block 430. If the image data still exceeds the threshold, process 400 can further increase the exposure period and capture additional image data.

When the number of cutoff pixels does not exceed the predetermined value ("NO" path out of decision block 430), process 400 may then determine whether more than one image has been captured during process 400 at decision block 445.

According to one embodiment, image data for a scene may be combined from at least two images, wherein each image is captured with different exposure periods, to produce a high dynamic range (HDR) image. However, it should also be appreciated that a high dynamic range for a scene may be produced based on a single image with a corresponding exposure period. According to one embodiment, when more than one image is captured in process 400 ("YES" path out of decision block 445), the image data of each of the captured images (e.g., captured exposures) may be combined by a processor (e.g., processor 110) of the imaging device (e.g., 110) to generate a high dynamic range image at block 450. When only one image is captured by process 400 ("NO" path out of decision block 445), a high dynamic range image may be generated at block 455.

One advantage of the process of FIG. 4 may be to minimize the amount of images required to produce a HDR image. Therefore, an automatic and real-time production of a high dynamic illumination range of a scene can be achieved.

Figure 5:
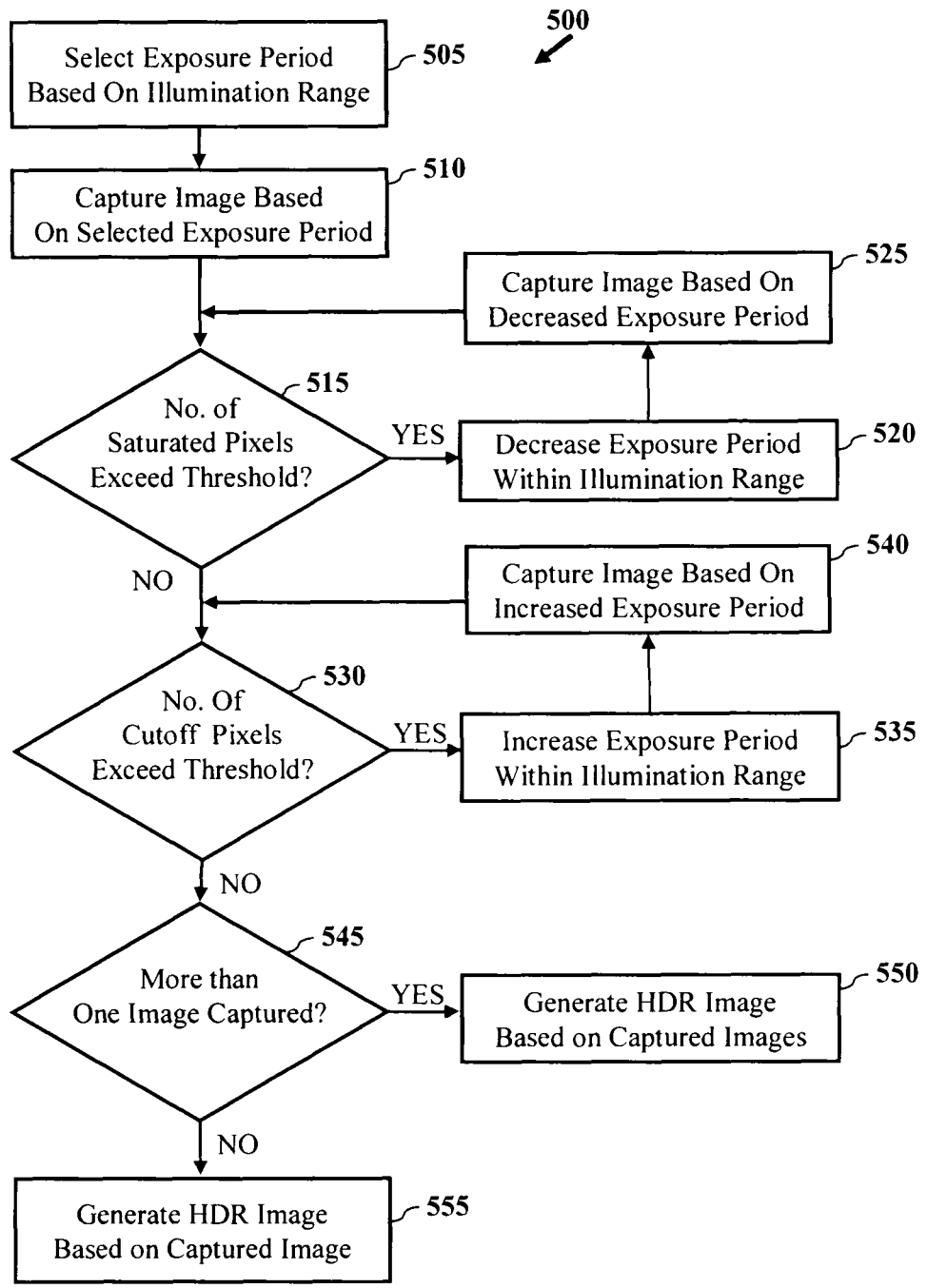
FIG. 5 depicts a process for producing a high dynamic range (HDR) image according to another embodiment of the invention.

Referring now to FIG. 5, a process is depicted for generating a high dynamic range image according to another embodiment. Process 500 relates to process for producing a high dynamic range image similar to the process of FIG. 4, with the addition of detecting exposure periods based on an illumination range for a scene. For example, process 500 may include determining exposure parameters and/or an illumination range prior to capturing image data.

Process 500 may be initiated by selecting an exposure period based on an illumination range at block 505, such as the illumination range determination of FIG. 3. In an exemplary embodiment, process 500 may determine exposure periods $T_1$, $T_2$ and $T_3$, wherein the exposure period for the imaging device is set to $T_2$ at block 505. Process 500 may then capture an image based on the selected exposure period (e.g., $T_2$) at block 510.

Once a first image is captured, process 500 may then determine whether the captured image data includes a number of saturated pixels that exceeds a predetermined threshold value (e.g., saturation threshold) at decision block 515. When the number of saturated pixels exceeds the predetermined value ("YES" path out of decision block 515), process 500 may then decrease the exposure period at block 520 to an exposure value based on the illumination range (e.g., $T_1$) and capture image data based on the decreased exposure period at block 525.

When the number of saturated pixels does not exceed the predetermined value ("NO" path out of decision block 515), process 500 may then determine whether the captured image data includes a number of cutoff pixels that exceeds a predetermined threshold value (e.g., cutoff threshold) at decision block 530.

When the number of cutoff pixels exceeds the predetermined value ("YES" path out of decision block 530), process 500 may then increase the exposure period at block 535 to an exposure within the illumination range (e.g., $T_3$) at block 535 and capture image data based on the increased exposure period at block 540. When the number of cutoff pixels does not exceed the predetermined value ("NO" path output of decision block 530), process 500 may then determine whether more than one image is captured during process 500 at decision block 545.

According to one embodiment, when more than one image is captured during process 500 ("YES" path out of decision block 545), the image data of each of the captured images (e.g., exposures) may be combined by a processor (e.g., processor 120) of the imaging device (e.g., 100) to generate a high dynamic range image at block 550. When only one image is captured during process 500 ("NO" path out of decision block 545), a high dynamic range image may be generated at block 555 based on a single image.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for producing a high dynamic range (HDR) image of a scene by a digital camera, the method comprising the acts of:
    determining an illumination range of the scene, by the digital camera, for at least one preview image captured by the digital camera, wherein the illumination range of the scene is based at least on a number of pixels in the at least one preview image that are measured to exceed a saturation threshold;
    determining a minimum number of exposures that are based on at least a minimal overlap in exposure values between two exposures;
    calculating a set of exposure parameters based on the illumination range of the scene, the exposure parameters indicating the minimum number of exposures to generate the high dynamic range image for the illumination range;
    capturing image data for one image of the scene based on the calculated set of exposure parameters, wherein the image data includes the minimum number of exposures; and
    generating the high dynamic range image, by the digital camera, for the scene based, at least in part, on the captured image data for the one image of the scene.

2. The method of claim 1, wherein the exposure parameters include a number of exposures, and an exposure period corresponding to each exposure.

3. The method of claim 1, wherein the minimum number of exposures is based on an illumination range of an image sensor of the digital camera, a minimum exposure period for the scene, and a maximum exposure period for the scene.

4. The method of claim 1, wherein determining the illumination range of the scene further includes:
    setting an exposure period for capturing preview image data,
    capturing the at least one preview image of the scene based on the exposure period,
    determining a number of saturated pixels in the at least one captured preview image,
    decreasing the exposure period when the number of saturated pixels exceeds the saturation threshold, and
    setting a minimum exposure period for the scene based on the exposure period when the number of saturated pixels does not exceed the saturation threshold.

5. The method of claim 1, wherein determining the illumination range of the scene further includes determining a number of saturated pixels in a captured preview image based on a decreased exposure period, and decreasing the exposure period further when a number of saturated pixels in another captured preview image associated with the decreased exposure period exceeds the threshold.

6. The method of claim 1, wherein determining the illumination range of the scene includes:
    setting the exposure period for capturing a preview image of the scene,
    capturing the preview image of the scene based on the exposure period,
    determining a number of cutoff pixels in the captured preview image,
    increasing the exposure period when the number of cutoff pixels exceeds a cutoff threshold, and
    setting a maximum exposure period for the scene based on the exposure period when the number of cutoff pixels does not exceed the cutoff threshold.

7. The method of claim 6, wherein determining the illumination range of the scene includes further includes determining the number of cutoff pixels in the captured preview image based on the increased exposure period, and increasing the exposure period further when the number of cutoff pixels in a captured preview image exceeds the saturation threshold.

8. The method of claim 1, wherein the exposure parameters define a number of exposures, wherein the number of exposures is related to a quotient of a difference between a maximum dynamic range of the scene and a minimal overlap between two exposures required to produce a high dynamic range image, and a difference between an illumination range of an image sensor of the digital camera and a minimal overlap between the two exposures.

9. The method of claim 1, wherein generating high dynamic range image data for the scene includes combining the image data for one or more images captured by the digital camera associated with a plurality of exposure periods.

10. The method of claim 1, wherein the high dynamic range image is generated in real-time, or near real-time, by the digital camera.

11. A device configured to provide a high dynamic range image of a scene, the device comprising:
    an image sensor configured to capture image data of the scene; and
    a processor coupled to the image sensor, the processor configured to:
        determine an illumination range of the scene for at least one preview image that is based at least on a number of pixels in the at least one preview image that are measured to exceed a saturation threshold;
        employ the illumination range of the scene to set an exposure period of the image sensor;
        receive a first captured image corresponding to the exposure period;
        check the first image data to determine whether a number of saturated pixels exceeds the saturation threshold;
        check the first image data to determine whether a number of cutoff pixels exceeds a cutoff threshold;
        determine a minimum number of at least one image that are based on at least a minimal overlap in exposure values between two exposures; and
        generate the high dynamic range image based at least on the captured first image data, wherein the high dynamic range image is generated based on the minimum number of at least one image to capture a full dynamic range of the scene.

12. The device of claim 11, wherein the minimum number of exposure is based on an illumination range of the image sensor, a minimum exposure period for the scene, and a maximum exposure period for the scene.

13. The device of claim 11, wherein the processor is configured to receive a subsequent image corresponding to a reduced exposure period when the number of saturated pixels in the first captured image exceeds the saturation threshold.

14. The device of claim 11, wherein the processor is configured to receive a subsequent image corresponding to an increased exposure period if the number of cutoff pixels in the first captured image exceeds a cutoff threshold.

15. The device of claim 11, wherein the processor is configured to generate a high dynamic range image based on combining received images into one high dynamic range image when a total number of captured images is more than one.

16. The device of claim 11, wherein processor is configured to set the exposure period based on an intermediate exposure period value associated with the determined illumination range of the scene.

17. A method for producing a high dynamic range (HDR) image of a scene by a digital camera, the method comprising the acts of:
determining an illumination range of the scene for at least one preview image that is based at least on a number of pixels in the at least one preview image that are measured to exceed a saturation threshold;
employing the illumination range of the scene for setting an exposure period of an image sensor of the digital camera;
capturing image data for one image, by the digital camera, based on the exposure period;
checking the image data to determine whether a number of saturated pixels exceeds saturation threshold;
checking the image data to determine whether a number of cutoff pixels exceeds a cutoff threshold;
determining a minimum number of one or more images that are based on at least a minimal overlap in exposure values between two exposures; and
generating the high dynamic range image based on at least image data for the one image captured by the digital camera, wherein the high dynamic range image is generated based on the minimum number of one or more images to capture a full dynamic range of the scene.

18. The method of claim 17, wherein the minimum number of one or more images is based on an illumination range of the image sensor, a minimum exposure period for the scene, and a maximum exposure period for the scene.

19. The method of claim 17, further comprising capturing a subsequent image corresponding to a reduced exposure period when the number of saturated pixels in a first captured image exceeds the saturation threshold.

20. The method of claim 17, further comprising capturing a subsequent image corresponding to an increased exposure period if the number of cutoff pixels in a first captured image exceeds a cutoff threshold.

21. The method of claim 17, wherein generating a HDR image is based on combining captured images into one high dynamic range image when a total number of captured images is more than one.

22. The method of claim 17, wherein the exposure period is set based on an intermediate exposure period value associated with the determined illumination range of the scene.

23. The method of claim 17, wherein the high dynamic range image is generated in real-time, or near real-time, by the digital camera.

24. The method of claim 1, further comprising capturing a subsequent image corresponding to a reduced exposure period when the number of saturated pixels in a first captured image exceeds the saturation threshold.

25. The method of claim 1, further comprising capturing a subsequent image corresponding to an increased exposure period if the number of cutoff pixels in a first captured image exceeds a cutoff threshold.

* * * * *

UNITED STATES PATENT AND TRADEMARK OFFICE
CERTIFICATE OF CORRECTION

| | |
|---|---|
| PATENT NO. | : 8,582,001 B2 |
| APPLICATION NO. | : 12/756035 |
| DATED | : November 12, 2013 |
| INVENTOR(S) | : Tzur et al. |

It is certified that error appears in the above-identified patent and that said Letters Patent is hereby corrected as shown below:

In the Specification

In Column 3, Line 9, delete "of it" and insert -- of a --, therefor.

In Column 3, Lines 13-14, delete "device, The" and insert -- device. The --, therefor.

In Column 4, Line 4, delete "bits" and insert -- bits. --, therefor.

In Column 4, Line 52, delete "FIG. 1." and insert -- FIG. 1, --, therefor.

In Column 6, Line 64, delete "bit, gray" and insert -- bit gray --, therefor.

In Column 7, Line 14, delete "305, For" and insert -- 305. For --, therefor.

In Column 7, Line 19, delete "range. in" and insert -- range. In --, therefor.

In Column 7, Line 34, delete "data. in" and insert -- data. In --, therefor.

In Column 7, Lines 39-40, delete "parameters. in" and insert -- parameters. In --, therefor.

In Column 8, Lines 53-55, delete "increase the exposure period at block 335 and capture subsequent preview images at block 340" and insert -- increase the exposure period at block 345 and capture subsequent preview images at block 335 --, therefor.

In Column 10, Line 11, delete "processor 110)" and insert -- processor 120) --, therefor.

In Column 10, Line 12, delete "110)" and insert -- 100) --, therefor.

Signed and Sealed this
Twentieth Day of May, 2014

Michelle K. Lee
*Deputy Director of the United States Patent and Trademark Office*

CERTIFICATE OF CORRECTION (continued)
U.S. Pat. No. 8,582,001 B2

In the Claims

In Column 12, Line 15, in Claim 7, delete "includes further includes" and insert -- further includes --, therefor.